United States Patent [19]
Cazanove
[11] 3,795,897
[45] Mar. 5, 1974

[54] METHOD AND DEVICE FOR TRANSFER OF SERIES PROCESS INFORMATION PARTICULARLY FOR SYNCHRONIZATION IN AN ELECTRONIC COMPUTER

[75] Inventor: Jean Cazanove, Barentin, France
[73] Assignee: Burroughs Corporation, Detroit, Mich.

[22] Filed: Aug. 2, 1972
[21] Appl. No.: 277,229

[30] Foreign Application Priority Data
Aug. 30, 1971 France .............................. 71.31333

[52] U.S. Cl. .............................. 340/172.5, 235/152
[51] Int. Cl. ........................ G06f 11/00, G06k 17/00
[58] Field of Search.. 235/61.7 A, 61.7 R, 165, 177; 340/146.1 D, 172.5

[56] References Cited
UNITED STATES PATENTS

| | | | |
|---|---|---|---|
| 2,969,913 | 1/1961 | Cherin et al. | 340/172.5 |
| 3,507,998 | 4/1970 | Moeller | 340/146.1 D |
| 3,529,296 | 10/1970 | Friedman et al. | 340/172.5 |
| 3,613,082 | 10/1971 | Bouchard | 340/172.5 |
| 3,648,237 | 3/1972 | Frey, Jr. et al. | 340/146.1 D |
| 3,662,346 | 5/1972 | Kiyoyuki Tada | 340/172.5 |

*Primary Examiner*—Paul J. Henon
*Assistant Examiner*—Michael Sachs
*Attorney, Agent, or Firm*—Leonard C. Suchyta; Edward G. Fiorito; Paul W. Fisk

[57] ABSTRACT

The present invention relates to the series processing of information in electronic calculator circuits.

According to the disclosure, an auxiliary shift register looped with an information shift register is used. A special pilot digit is introduced into the auxiliary shift register, and shifting is caused for each digit until the pilot digit returns to the auxiliary register.

11 Claims, 11 Drawing Figures

METHOD AND DEVICE FOR TRANSFER OF SERIES PROCESS INFORMATION PARTICULARLY FOR SYNCHRONIZATION IN AN ELECTRONIC COMPUTER

SUMMARY OF THE INVENTION

The present invention relates to electronic circuits for processing information represented in the form of electrical signals which are transferred in series by successive bits of information, and to the method for utilizing the same for synchronizing the processing of information in an electronic calculator. More particularly, in the case of desk sized electronic calculator, the invention relates to the synchronized transfer of numerical information between the various memory devices or shift registers used.

In electronic calculators, the speed of calculation is not decisive and so they are designed to execute arithmetic operations in series. Under these conditions, the elementary numerical information is processed by the significance of each of the successive numbers starting with the least significant number. This is the case, for example, for office calculators, or desk top calculators. In this instance, the numerical information is entered into the calculator by means of a keyboard, and the numbers are introduced using the base 10 and in the order of decreasing significance.

Electronic devices are known which can simply process only elementary information having two different states, that is to say binary elementary information. Decimal figures are therefore converted by means of a code into binary coded decimal, BCD, in order to be processed in the calculator.

The usual means for processing the numerical information is a shift register in which the information usually is entered starting with the lower binary weights, or in the order of least significance, in synchronism with clock pulses. Such shift registers are called herein functionally, information registers. The logic circuit controlling the operation of the calculator must receive a unit of information at shift state during numerous operations.

The use of a counter for each figure, or binary coded decimal digit associated with a counter of elementary binary information units, or bits, in which the simple divisor is four, is known. These counters count the number of clock pulses applied to an information register, in such a way as to furnish, to the logic control circuit, a unit of information during the state of change for transfer of the digits.

If all the information registers have the same fixed length, the digit counter is connected to a decoder which supplies a specific signal at one of its outputs when the current operation on the entire contents of information register is complete and is therefore terminated.

When arithmetical registers length can be changed, for example by combining two registers to increase the maximum number of digits permitted, it is then necessary to provide two different counting capacities for the digit counter, which in turn requires switching changes in the counter and substantially complicates the connection of the decoder to the logic control circuit.

The object of the present invention is to provide a method and an apparatus which considerably simplifies the digit transfer operations and the synchronization of the operation of a calculator regardless of the length of the arithmetic registers used, with no need for switching control.

According to the invention, we use a special information character, having a binary code reserved for it, and comprising a number of bits equal to that of the information digits to be identified, such as BCD digits. An auxiliary shift register is used, with a number of binary positions equal to the number of bits of the said special character. The special character is introduced into the said auxiliary shift register. The operations of transfer of information from at least a first information register, consist of the following steps:

- the special character is introduced into the auxiliary shift register;
- the output of the auxiliary shift register is connected to the input of the first shift information register and the input of the auxiliary shift register is connected to the output of the shift information register;
- a shift number, equal to the number of binary positions of the auxiliary register is executed synchronously in the first shift information register and the auxiliary shift register; and
- the same number of synchronous shifts is repeated until the auxiliary shift register again contains the binary information of the said special character.

This information can be furnished at the output of the auxiliary shift register or to the first register of information. Insofar as the circulation of the information is concerned, the auxiliary register can be connected in series, above or below, or in parallel, relative to the first information register.

According to the invention, the transfer of information from one or more information registers are synchronized with the first register by shifting all the registers, with consideration given to the position of the auxiliary register relative to the first information register.

Other characteristics and advantages of the invention will appear upon reading the detailed description which follows, made with reference to the attached drawing, given only by way of example, in which.

One can describe the invention in detail, with respect to an electronic calculator in which the numerical information is represented by binary coded decimal digits.

When such electronic calculators work in series, the numerical information or digits contained in the base 10 in the information registers comprise the numbers 0 to 9 inclusive. Under these conditions, the coding values of the digits which could correspond to the numbers 10 to 15 inclusive, if coded in binary, are not used. Such digits can only be found after an arithmetic operation, and in general they are immediately corrected before being introduced into a shift information register.

The French patent application bearing Ser. No. 7131333 Aug. 30, 1971 in the name of Burroughs Corporation and entitled "Electronic device for series addition-subtraction, particularly in binary coded decimal representation," described means for making this correction. This appication was filed in the United States Patent Office on Aug. 2, 1972 bearing Ser. No. 277,221 and claiming priority from the said French application. The Applicant is Jean Cazanove. As we shall see below, it is advantageous to use the method of the present invention in the said patent application. This application is incorporated herein by reference.

According to the preferred embodiment, an electronic computer having a special digit with a code reserved for it is used, and which code can be, for example, equal to one of the numbers 10, 11, 12, 14, or 15. The special digit will be called a pilot digit. In the remainder of the present description we will consider, for purposes of example, that this pilot digit has a value equal to 15.

We also use a shift register having four binary positions to contain the four bits of information of BCD coding of the pilot digit. When the natural binary coded decimal code is used, the binary value of the pilot digit is then 1111.

The pilot digit has two principal applications: to control an operation of information transfer from one register to another, and to replace the digit counter and its decoder, making it possible to avoid switching control in changes when the maximum number of digits that an information register can contain is modified.

The pilot digit, associated with an auxiliary shift register containing it, makes it possible by itself to synchronize the operations in the whole electronic calculator.

We will now describe, with reference to FIGS. 1 to 3G, an example of application of the preferred embodiment to the control of a copy operation of the contents of one information register into the other information register, that is, a "MOVE" instruction.

This relatively simple operation registers only in two information registers. However, it should be understood that the electronic calculator of the preferred embodiment has three information registers in its arithmetic unit for executing more complex arithmetic operations.

Figure 1:
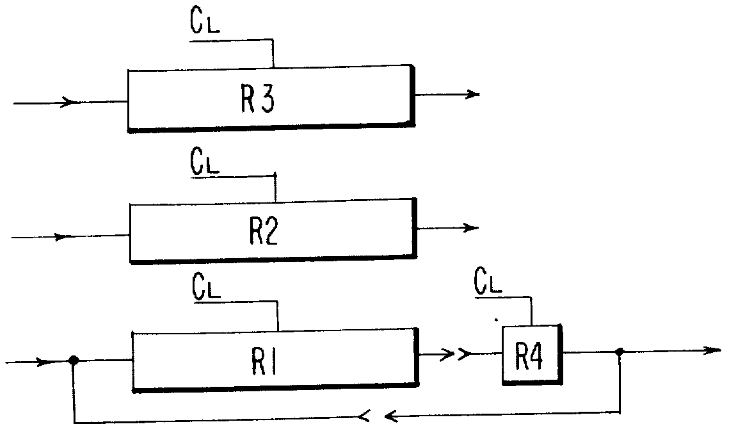
FIG. 1 is an electrical diagram showing connections of the auxiliary shift register, a first shift information register and two second shift information registers.

FIG. 1 represents these three registers which consists of a first information register R1 and two other information registers R2 and R3. Registers R1 to R3 all have the same length, that is to say that they are capable of containing exactly the same number of bits, which is a whole multiple of four since each digit contains four bits.

An auxiliary register R4, having a length of four bits, that is to say, capable of containing one digit, is used to contain the special pilot digit character, as mentioned above.

Auxiliary register R4 and the information registers R1 to R3 each has an input $C_L$ for receiving clock pulses. Register R4 is also disposed in such a way as to have its input and its output connected, respectively, to the output and the input of the first information register R1.

This connection of register R4 to register R1 can be permanently established. However, very advantageously, it results from switching commanded by the calculator control logic prior to the copying operation itself. In the latter case, the auxiliary register can be connected on command to different information registers.

Figure 2A:
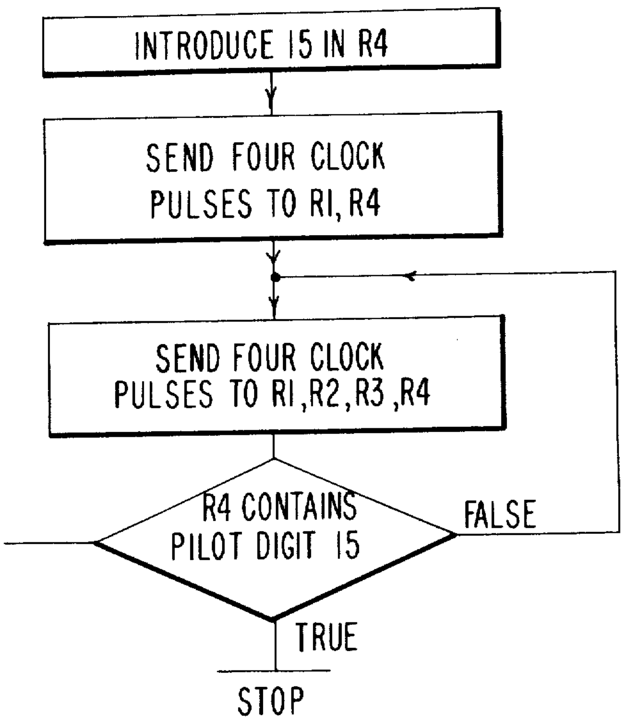
FIG. 2A is a diagram illustrating the successive steps of the process according to the invention; and, FIG. 2B is the corresponding state diagram.

As soon as those connection are established, the method according to the preferred embodiment progresses according to the diagram represented in FIG. 2A. This introduction can be made, for example, by applying the logical level UH to the four stages of the shift register R4, which has the effect of applying digit 1111. The second stage consists in sending four clock pulses to registers R1 and R4. This has the effect of making a one digit shift of the contents of R1 and R4, which are connected in series. The pilot digit then is located in the first four of the binary positions of register R1 and the digit originally contained in the last digit location of register R1 is now in register R4.

The next stage consists in sending four clock pulses to all the registers, namely, R1, R2, R3, and R4. This has the effect of causing a one digit shift in all the registers. The digit of lower weight or least significance originally contained in the last digit of register R1 then appears at the output of register R4, bit by bit, likewise from lower weights. The lower-weight digits of register R2 and R3 are furnished at their output respectively in the same way.

The next stage consists in testing the contents of R4. If the content of register R4 is not equal to the pilot digit, the latter two stages of the method are repeated. Each time that these stages are repeated, a fresh digit appears at the outputs of registers R4, R2, and R3.

When register R4 contains pilot digit 15, the operation in progress is terminated, because all the digits contained in the registers R1 to R3 have been transmitted. This is true regardless of the length of registers R1 to R3, provided that they remain equal to one another.

Figure 2B:
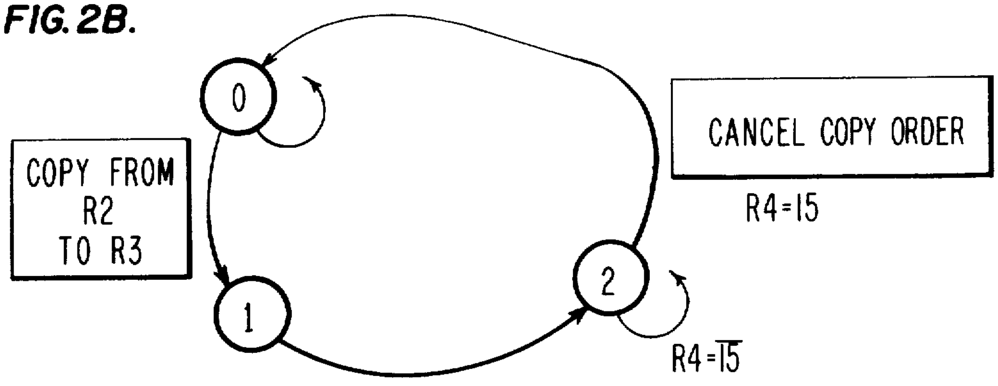

FIG. 2B represents the state diagram corresponding to the diagram in FIG. 2A. Each state 0, 1, 2 lasts for four clock pulses, or a multiple of four clock pulses. The changes in state respond to given conditions as will appear to those skilled in the art.

State 0 corresponds to the introduction of digit 15 into register R4. This introduction lasts for four successive clock pulses. If during the four clock pulses, of state 0, an instruction: "copy R2 in R3" is emitted, the first clock pulse in the next group of four clock pulses will be emitted for state 1.

State 1 lasts only for four clock pulses, and these clock pulses are applied to registers R1 and R4. The start of state 2 corresponds to the first clock pulse of the next group of four pulses.

State 2 lasts for a whole multiple of four clock pulses. Each group of four pulses, is, during state 2, sent to register R1, R2, R3, R4 — as long as register 4 does not contain digit 15 (condition R4 = 15 is true).

When register R4 contains digit 15, the aforementioned copy order is canceled, and a change in state is produced for a return to the starting point of state 0.

Figure 3A:
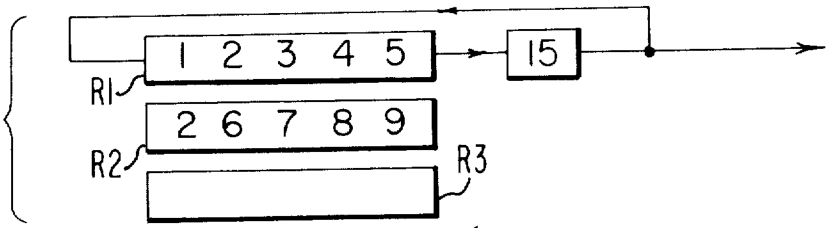
FIG. 3A to 3G are schematic illustrations of the displacement of the numerical information digits in the course of the use of the method according to the invention.

With reference to FIG. 3A to 3G, one will see an example of an application of preferred method of using the apparatus described. FIG. 3A represents the original contents of the registers of FIG. 1, after the pilot digit has been entered into register R4. The contents of register R2 is numerical quantity which is to be copied in register R3. The contents of register R3 is any quantity which is to be erased, and the contents of register R1 is any numerical quantity which is retained.

After the said interconnections have been made between register R1 and Register R4, four clock pulses are applied to these two registers, which has the effect of shifting the digits which they contain by four binary positions, that is to say, by the length of one digit. In the same way, the digits originally contained in register R4 are shifted. At the same time, pilot digit 15 is placed in last position (relative to the output) in register R1.

Figure 3B:
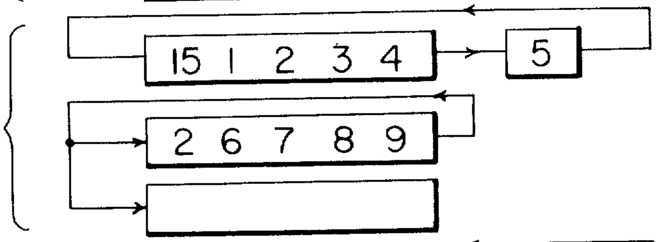

Before, during or after the second stage, registers R1, R2, R3, R4 are connected to the adjoining components used to execute the operations as is known in the art. To illustrate the preferred embodiment, in simple fashion, the operation which consists in copying the contents of register R2, in register R3, without altering the contents of register R2 will be described. With this in mind, the output of register R2 is connected to its input, at the same time as to the input of register R3, (FIG. 3B).

Figure 3C:
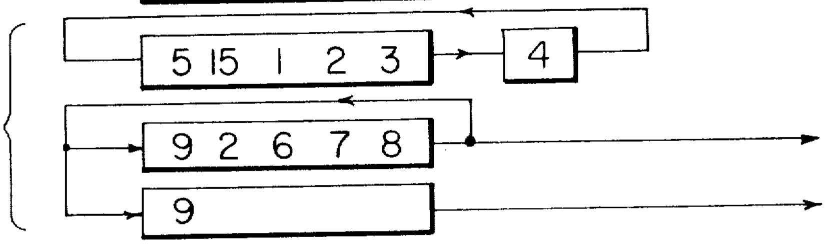
Figure 3D:
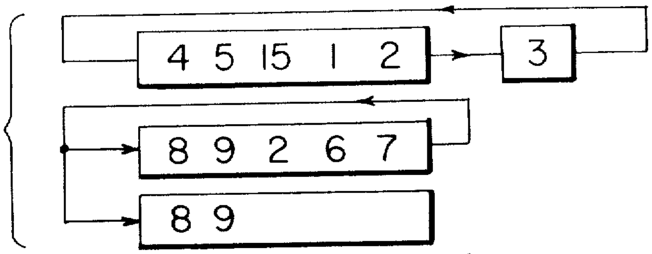

The third operation of the process, which consists in applying four clock pulses to all the registers, has the result of another one-digit shift in all the registers. Register R1 then contains the pilot digit in the second-to-last place. The first digit 9 of register R2 is copied into the last position (relative to their output) of registers R2 and R3, all the other digits being shifted therein by the length of one digit (FIG. 3C). A test check is then run on register R4, which contains one digit 4, and in every case a digit which cannot be equal to pilot digit 15. Consequently, a fresh group of four clock pulses is applied to all the registers, and a shift of four binary positions is made, which has the effect of again displacing all the digits by one position with copying of the digits issuing from register R4 and register R2, respectively in last position in registers R2 and R3 (FIG. 3D).

Figure 3E:
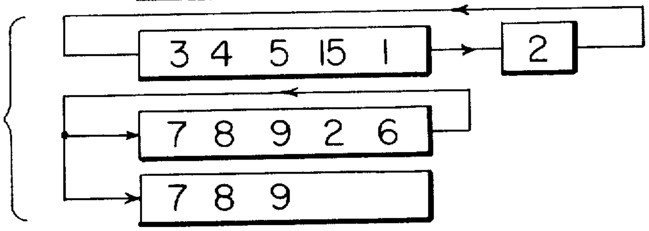
Figure 3F:
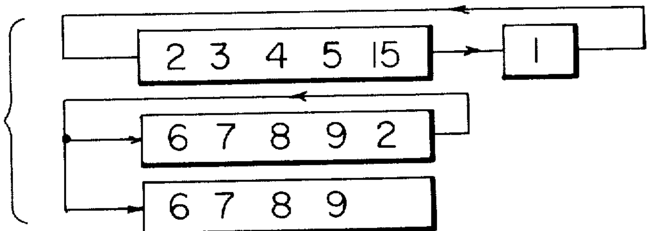
Figure 3G:
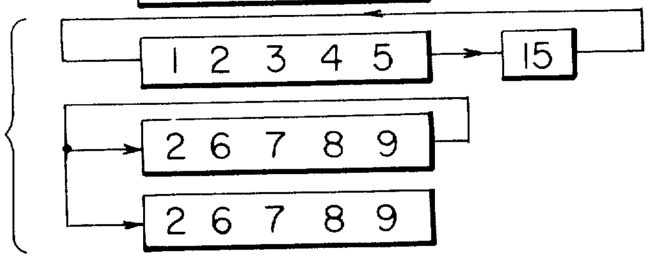

These operations are again repeated two times as illustrated in FIG. 3E and 3F, before pilot digit 15 has returned to the auxiliary register R4.

Finally, after a last group of four clock pulses is applied to the set of registers (FIG. 3G), pilot digit 15 is present in auxiliary register R4, and in all the registers, the numerical quantities have been displaced by a length corresponding to the maximum number of digits which they can contain. The operation which was synchronized by the pilot digit is therefore terminated. The entire original contents, (in this case 26,789) of register R2 is completely recopied in register R3: the contents of registers R1 and R2 are unchanged relative to the original state represented in FIG. 3A.

The use of a pilot digit and an auxiliary register makes it possible to dispense with counting the number of clock pulses applied to the numerical information register. Furthermore, the process is not dependent on possible and identical variations in the length of the registers used. It is sufficient to use an auxiliary shift register with four binary positions with means for forcing the pilot digit into this register, and a decoder set to decode a single value.

Figure 4:
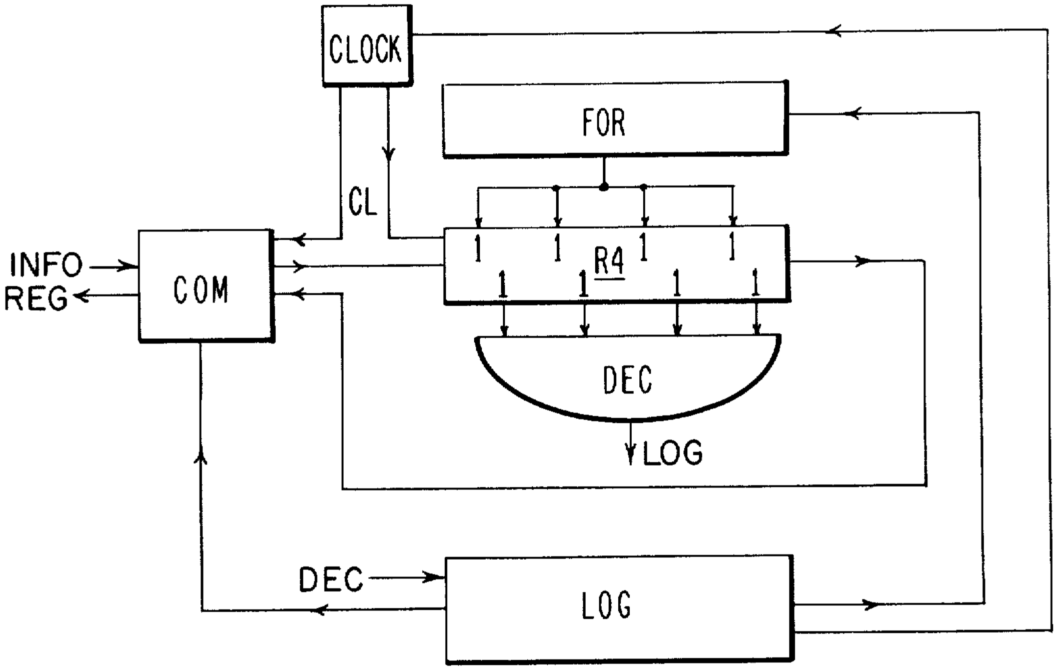
FIG. 4 represents, schematically, the principal electric circuits used in the electronic calculator.

In order to apply the method described, an electronic calculator using BCD digits should include, as represented in FIG. 4, an auxiliary shift register R4 with four binary positions, forcing means FOR, for introducing into this register a pilot digit corresponding to the BCD coding of a number comprised between 10 and 15 inclusive (in FIG. 4 – 15), and a decoder for the contents of the shift register which furnishes an output signal when the said contents is equal to the pilot digit. When pilot digit is 15, this decoder DEC is very simply constituted as an AND gate and four inputs connected, respectively, to the four stages of the auxiliary shift register.

Such an auxiliary register can be connected to the input or to the output of any information register of the electronic calculator by switching means COM (FIG. 4) the connection being made, for example, according to the diagram in FIG. 1. In this case, the auxiliary register can be disposed above an information register in order to introduce a quantity therein in a first period, and below the said register of information in order to extract therefrom the quantity introduced therein, in a second period.

The device in FIG. 4 also comprises a source of clock pulses CLK, which is connected to auxiliary register R4 and to switching means COM. It also comprises a logical command circuit LOG commanding the forcing FOR, and switching or commutation means COM, as well as the source of clock pulses CLK (at least insofar as its outputs are concerned). The logic circuit LOG receives the output of decoder DEC.

It should be understood that the function of the circuits in FIG. 4 are not limited by the description made of them. The logical command circuit LOG and the switching means COM and clock source CLK can also embody functions known in the art. The registers employed herein are shift registers while the command circuit LOG is a ring counter and the switching means is a full adder, subtractor. Moreover, the separations between the circuits are given by way of illustration, and correspond only to their functions. In large-scale integrated circuit technology, in particular, these separations have no material significance.

Variations can be employed in the preferred embodiment of the invention. The auxiliary shift register can be disposed either in series, above, or below, with an information register, or in parallel with this register. In the latter case, the prior stage which consists in applying four clock pulses only to the shift register and to the information register with which it is associated, is eliminated. This variant is applicable under a condition in which the length of one of the information registers is found to exceed, by the length of a digit, the length of the information register associated with the auxiliary shift register.

One case in which this condition is found is in the above mentioned co-pending patent application which is incorporated herein. Registers 1 and 2 are thus information registers of the same length. Register 4 (four binary positions or one digit) constitute the output of an adder-subtractor furnishing corrected BCD digits. The auxiliary register has the pilot digit already present before the start of the addition-subtraction operation.

In an electronic calculator, the use of a pilot digit, an auxiliary shift register with a decoder and forcing means for the said pilot digit in the auxiliary shift register considerably simplifies the surveillance of the operations of transfer of numerical quantities between the various registers used from the input of information into the calculator, to their output from the latter as by printing or display.

Each time a type of coding of information used in series leaves certain code values unused, the invention as described with respect to a preferred embodiment permits, by means of a pilot digit equal to one of these values, the synchronization of the displacement in series of this information in the information registers.

I claim:

1. A method of serially transferring binarily encoded information from at least one first shift register storing at least a predetermined bit length of information, the output and input of said first shift register being respectively coupled to the input and output of a second shift register, said method comprising the steps of:
- storing said code character of a predetermined bit length and bit value in said second shift register,
- synchronously and simultaneously shifting said code character into said first shift register and a length of information equal to the predetermined bit length from said first shift register into said second shift register,
- decoding the contents of said second shift register, and
- repeating the steps of shifting and decoding until said code character is detected in said second shift register.

2. A method of serially transferring binarily encoded information from at least one first shift register storing at least one word of information, said first shift register being coupled to a second shift register in a recirculating configuration, said method comprising the steps of:
- storing a code word having a predetermined value and bit length in said second shift register,
- serially and simultaneously shifting said code word into said first shift register and a portion of said word of information equal to said predetermined bit length into said second shift register,
- decoding the word now stored in said second shift register, and
- repeating the steps of shifting and decoding until said code word is detected in said second shift register.

3. In a digital system having at least a first shift register for storing at least a predetermined number of bits of information and a second shift register for storing a code character of an equal predetermined number of bits, the output and input of said first shift register being coupled respectively to the input and output of said second shift register, a method of transferring said information from said first shift register comprising the steps of:
- storing said code character in said second shift register,
- shifting a portion of said predetermined number of bits of information into said second shift register and simultaneously shifting an equal number of bits of said code character into said first shift register,
- decoding the contents of said second shift register,
- repeating said steps of shifting and decoding, and
- preventing further shifting and decoding upon decoding said code character.

4. In a digital system having a first, a second and a third shift register of equal length for storing at least a predetermined number of bits of information, said second shift register having its input and output coupled together and said output being further coupled to the input of said third shift register, and a fourth shift register coupled in a recirculating configuration with said first shift register for storing a code character of a predetermined number of bits, a method for serially transferring information from said second shift register to said third shift register comprising the steps of:
- storing said code character in said fourth shift register;
- shifting serially said code character into said first shift register;
- shifting simultaneously an equal predetermined number of bits of information currently stored in said fourth shifting register into said first shift register, an equal predetermined number of bits currently stored in said first shift register into said fourth shift register and an equal predetermined number of bits currently stored in said second shift register into said third shift register;
- decoding the contents of said fourth shift register;
- repeating the steps of simultaneous shifting and decoding; and
- terminating the steps of simultaneous shifting and decoding upon detecting the presence of said code character in said fourth shift register.

5. Apparatus for serially transferring information from at least one first shift register storing at least a predetermined number of bits of said information comprising:
- a second shift register for storing a code character of an equal predetermined number of bits, the input and output of said second shift register being coupled respectively to the output and input of said first shift register,
- check means coupled to said first and second shift registers for repeatedly shifting simultaneously some of said predetermined number of bits of information into said second shift register and an equal number of bits of said second shift register into said first shift register; and
- decoding means coupled to said second register and to said clock means for determining the presence of said code character in said second shift register and for preventing further shifting by said clock means.

6. The apparatus according to claim 5 wherein said means for decoding comprises:
- a decoder coupled to said second shift register to decode the contents thereof, and
- logic means responsive to said decoder for controlling said clock means.

7. The apparatus according to claim 6 wherein said first shift register stores a plurality of words of said information with each word length equal said predetermined number of bits.

8. The apparatus according to claim 7 wherein said second shift register is a one word register.

9. The apparatus according to claim 8 wherein said first shift register stores said information in binary coded decimal and said code character has a binary coded decimal value between 10 and 15.

10. The apparatus according to claim 9 further comprising a third register means coupled to said second shift register for storing said code character and transferring said code character to said second shift register in response to said logic means.

11. Apparatus for simplifying and synchronzing the serial transfer of information comprising:
- a first shift register for storing at least a predetermined number of bits of said information;
- a second shift register for storing a code character having a bit length equal to said predetermined number of bits, the input and output of said second shift register being coupled respectively to the output and input of said first shift register, at least one third shift register having capacity for storing an equal predetermined number of bits of said information as said first register;

switch means responsive to a transfer command for coupling said first and third shift registers in a predetermined manner;

clock means coupled to said first, second and third shift registers for repeatedly transferring simultaneously said predetermined number of bits from each of said first, second and third shift registers; and decoder means coupled to said second shift register and to said clock means for determining the presence of said code character in said second shift register and for inhibiting said clock means in response to the presence of said code character.

* * * * *

UNITED STATES PATENT OFFICE
CERTIFICATE OF CORRECTION

Patent No. 3,795,897 Dated March 5, 1974

Inventor(s) Jean Cazanove

It is certified that error appears in the above-identified patent and that said Letters Patent are hereby corrected as shown below:

Column 3, line 4, insert -- filed -- after 7131333.

Column 4, line 6, "connection" should read -- connections --; line 62, insert -- the -- before "preferred"; line 66, insert -- a -- before "numerical". Column 7, line 11, "said" should read -- a --, and "a" should read -- said --. Column 9, lines 7 - 9, delete See Claim 20.

Signed and sealed this 8th day of October 1974.

(SEAL)
Attest:

McCOY M. GIBSON JR.
Attesting Officer

C. MARSHALL DANN
Commissioner of Patents

RM PO-1050 (10-69)

USCOMM-DC 60376-P69
U.S. GOVERNMENT PRINTING OFFICE